United States Patent
Coughlan

[15] 3,673,935
[45] July 4, 1972

[54] DRIVE SYSTEM FOR A REFLEX MEMBER

[72] Inventor: Edward H. Coughlan, Canton, Mass.
[73] Assignee: Polaroid Corporation, Cambridge, Mass.
[22] Filed: Nov. 2, 1970
[21] Appl. No.: 86,250

[52] U.S. Cl. ..............................................95/11 R, 95/42
[51] Int. Cl..................................G03b 19/02, G03b 19/12
[58] Field of Search.............................................95/42, 11

[56] References Cited

UNITED STATES PATENTS 3,126,806    3/1964    Wiessner et al............................95/42

*Primary Examiner*—John M. Horan
*Assistant Examiner*—Kenneth C. Hutchison
*Attorney*—Brown & Mikulka, Alfred E. Corrigan and Lawrence G. Norris

[57] ABSTRACT

A lost-motion connection between a drive member and a reflecting member mounted in a camera of the single-lens reflex type. The reflecting member is mounted for movement between first and second positions and the lost-motion connection therebetween includes a crank mounted on the drive member for limited rotation relative thereto and a spring having one end connected to the crank and its other end connected to the drive member. Should there be any interference with the reflecting member as it is being driven to the second position, the lost-motion connection allows the energy of the drive to be stored by the spring rather than being utilized in an attempt to drive the reflecting member thereby preventing an overload on the camera's motor and/or battery. Upon removal of the interference, the energy stored in the spring is utilized to drive the reflecting member toward the second position.

12 Claims, 2 Drawing Figures

INVENTOR.
EDWARD H. COUGHLAN

BY
Brown and Mikulka
and
Alfred E. Corrigan
ATTORNEYS

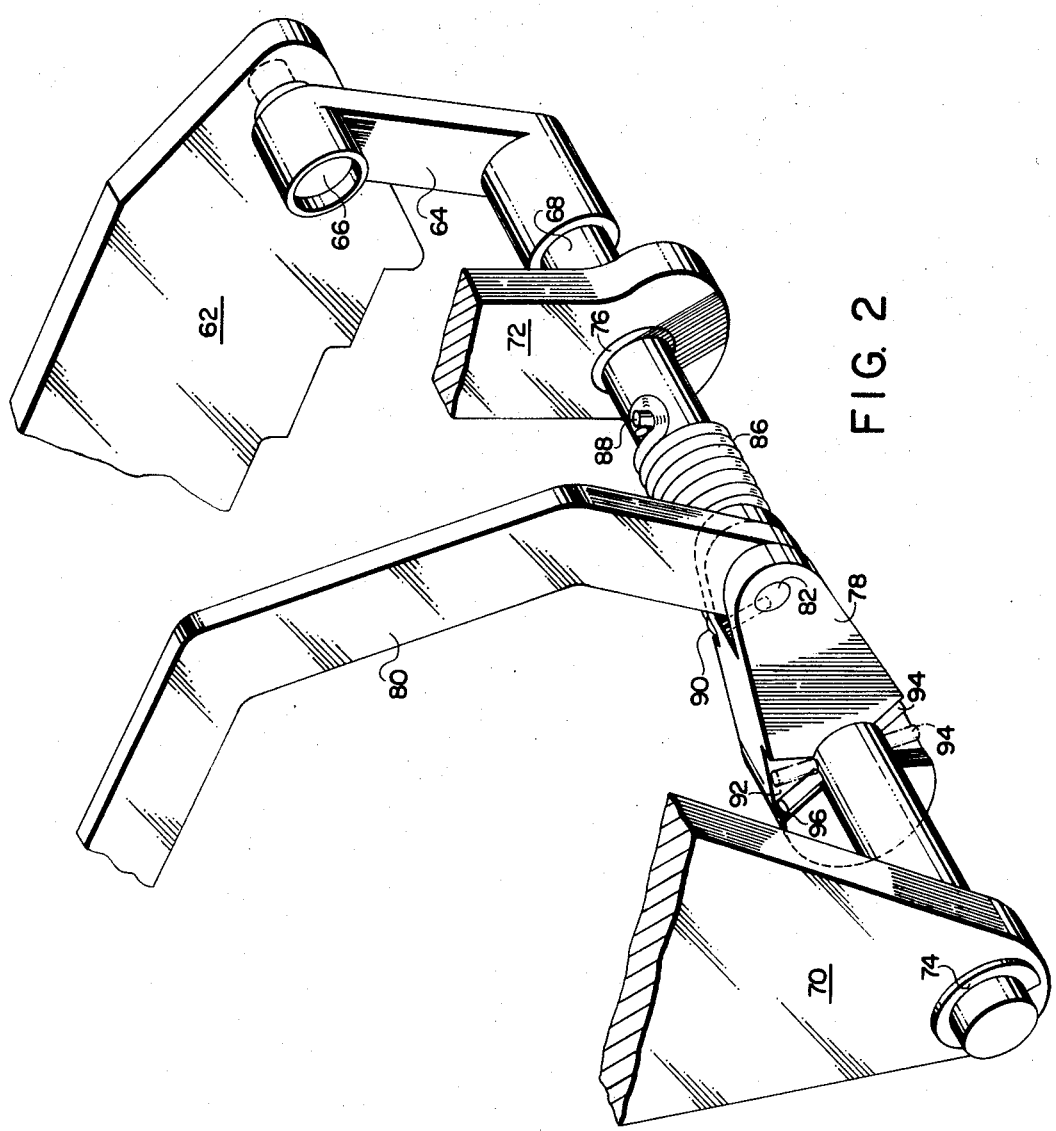

DRIVE SYSTEM FOR A REFLEX MEMBER

BACKGROUND OF THE INVENTION

1. Field of the Invention

This invention relates to photographic apparatus of the single-lens reflex type having a reflecting member mounted for movement between first and second positions.

2. Description of the Prior Art

The operation of cameras of the single-lens reflex type is well known and generally includes the steps of (1) viewing and focusing an image of the subject through the camera's objective lens and (2) actuating the shutter release button to (a) close the shutter, (b) move the camera's reflecting member to a first position which allows exposure of a film unit, (c) operate the shutter to make the exposure, and (d) move the reflecting member to a second or reflex position in preparation for the next exposure cycle. Movement of the reflecting member between the first and second position has been effected by means of springs and/or latching systems and lately by a battery operated motor located within the camera. Although the battery operated motor method of moving the reflecting member has certain advantages over the other methods mentioned, there is the danger that if the reflecting member encounters any interference during its movement toward the second position, the motor may be overloaded and possibly damaged, or, the power drain on the battery may be such as to render the battery incapable of operating components of the camera. For example, in film assemblages wherein a battery is one of the components of the assemblage, an excessive power drain on the battery may result in the battery being rendered inoperative before all of the film units contained in the assemblage have been processed.

SUMMARY OF THE INVENTION

The invention relates to cameras of the single-lens reflex type and, more specifically, to a drive system including a lost-motion connection for moving a reflecting member between a first, exposure position and a second, reflex position. The drive system includes a ram which is operatively connected to a first crank fixedly mounted on a shaft. A second crank is mounted on the shaft for limited rotation relative thereto and includes means such as a link for transmitting force from the second crank to the reflecting member for moving the reflecting member from a first or exposure position to a second or reflex position. A spring, having one end connected to the shaft and its other end connected to the second crank, cooperates with the second crank to form a lost-motion connection between the shaft and the reflecting member. During normal operation, the ram, through its connection with the first crank, rotates the shaft in a given direction. The spring transmits the rotational force of the shaft to the second crank for moving the reflecting member from the first position to the second position. If during the movement of the reflecting member between the first and second positions it encounters any significant interference, e.g., some object is inadvertently positioned in its path of travel, the lost-motion connection will allow the ram to continue to rotate the shaft until the ram has reached the end of its travel without the rotational force of the shaft being transmitted to the reflecting member. The energy of the rotating shaft which is normally used to rotate the second crank is stored by the spring until such time as the interference is removed. Upon removal of the interference, the energy stored in the spring is used to drive the reflecting member toward or into the second position. The spring also functions to ensure that the reflecting member is fully seated in the second position by allowing the stroke of the ram to be slightly longer than that required to move the reflecting member into the second position. In other words, any further movement of the ram after the reflecting member has been moved into the second position will be absorbed by the spring. This allows for a greater degree in manufacturing tolerances in the drive system since the various components of the system do not have to cooperate to move the reflecting member a precise distance, i.e., the exact distance between the first and second positions.

An object of the invention is to provide in photographic apparatus of the reflex type including a reflecting member mounted for movement between first and second positions and drive means for moving the reflecting member between the first and second positions, means for enabling the drive means to be actuated beyond a position necessary to move the reflecting member into the second position.

Another object of the invention is to provide in photographic apparatus of the reflex type including a reflecting member mounted for movement between a first, exposure position and a second, reflex position and drive means for driving the reflecting member from the first position to the second position, means responsive to interference of said movement for disenabling the drive means to move the reflecting member toward the second position until the interference has been removed.

Another object of the invention is to provide in photographic apparatus of the type set forth above, means for storing at least a portion of the energy of the drive means during the period that the interference is present and utilizing the stored energy to drive the reflecting member toward the second position upon removal of the interference.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 2 is an enlarged perspective view of a drive system for moving the reflecting member of the camera between a first, exposure position and a second, reflex position.

DETAILED DESCRIPTION OF THE INVENTION

Figure 1:
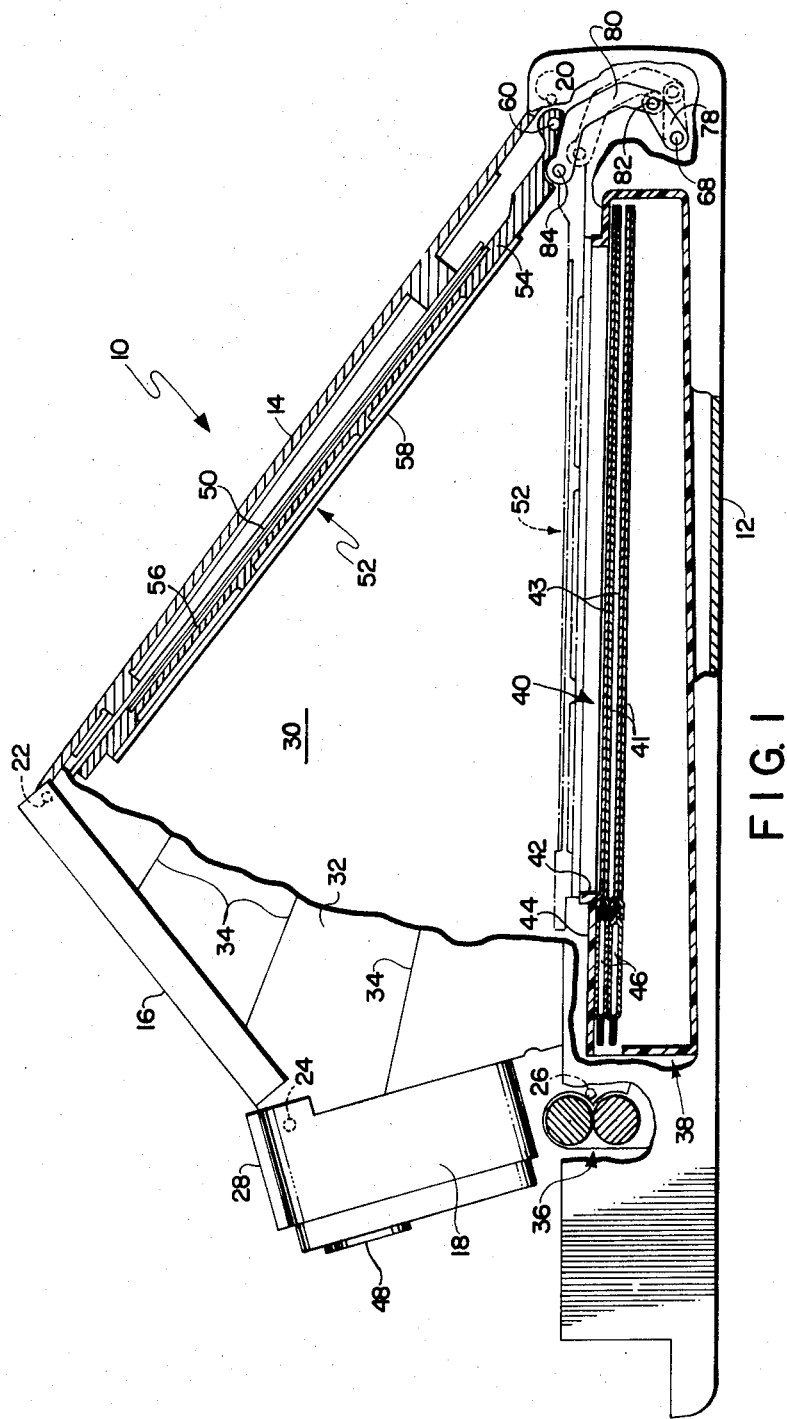
FIG. 1 is an elevational view, partly in section, of a collapsible type single-lens reflex camera, the camera being shown in its extended or operative position.

Reference is now made to FIG. 1 of the drawings wherein is shown a camera 10 of the extensible type, the camera being shown in its extended or operative position. Camera 10 includes a plurality of housing sections 12, 14, 16 and 18 suitably pivoted to each other about axes 20, 22, 24, and 26 for movement between the extended position shown and a compact folded position wherein housing sections 14 and 16 cooperate to define the top wall (as viewed in FIG. 1) of the camera and surface 28 of housing section 18 cooperates with an end portion of housing section 12 to define an end wall of the camera. Housing sections 12, 14, 16 and 18 cooperate with each other, in the extended position, to define four sides of a six-sided exposure chamber 30, the remaining two sides of the chamber 30 being closed by a flexible bellows 32 formed of any suitable opaque plastic material. Bellows 32 includes a plurality of creases 34 which constitute a memory system for ensuring that the bellows 32 collapses in a predetermined manner when the camera is folded.

Housing section 12 includes means (not shown) for mounting a pair of processing rolls 36 and a film container 38 such that the forwardmost film unit 40 located within the container 38 is located in position for exposure by light transmitted through an exposure aperture 42 located in wall 44 of the container 38.

Film units 40 (only two of which are shown) are similar to those shown in U.S. Pat. No. 3,415,644 and generally include a photosensitive element 41, a superposed transparent image-receiving element 43 and a pod 46 containing a processing liquid attached near one end of the two elements. After exposure, the forwardmost film unit is advanced by any suitable means from the container into the bite of processing rolls 36 wherein the pod 46 is ruptured and the liquid contained therein is evenly distributed between the photosensitive and image-receiving elements to initiate a diffusion transfer process as is more fully described in the aforementioned patent.

The camera's optical system generally includes a lens and shutter assembly 48, a generally planar reflecting surface, e.g., a mirror 50 mounted on an interior wall of housing section 14, a reflecting member 52 and a rangefinder and/or viewfinder (not shown). Reflecting member 52 includes a mirror mount 54 which carries a Fresnel-type mirror 56 on one side thereof and a generally planar mirror 58 on the opposite side thereof. As can be seen in FIG. 1, reflecting member 52 is pivotally mounted to the camera about pin 60 for movement between a first, exposure position shown in solid lines and a second, reflex position as shown in broken lines in FIG. 1.

As is more clearly shown in FIG. 2, the means for moving the reflecting member 52 from the first position to the second position include drive means comprised of a ram 62, a first crank 64 having one end pivotally coupled to ram 62 by a pin 66 and its other end fixedly attached to a shaft 68, and means (not shown) such as a battery powered motor for moving ram 62 to the right as viewed in FIG. 2. Shaft 68 is rotatably supported by the camera structure at 70 and 72 having suitable bearing means 74 and 76 therein. The means for transmitting the force from the drive means include a second crank 78 mounted on shaft 68 for limited rotation relative thereto, a link 80 having one end pivotally coupled to crank 78 at 82 and its other end pivotally coupled to the mirror mount 54 at 84, and a spring 86 having one end attached to shaft 68 at 88 and its other end located within a recess 90 in crank 78. Spring 86 is originally conditioned so as to urge crank 78 in a clockwise direction to ensure that reflecting member 52 will be fully seated in the second position thereby making a lighttight seal with the film container 38. It should be noted that the above concept of forming a lighttight seal between the reflecting member and the film container is not my invention but was derived from Edwin H. Land.

During operation of the camera, the reflecting member is initially in the broken line position shown in FIG. 1. The image of the subject to be photographed is transmitted by the camera's objective lens 48 into the interior of exposure chamber 30 wherein it is reflected by mirror 50 onto Fresnel-type mirror 56 and thence to the camera's viewfinder. After the image has been properly focused, the camera's shutter actuating button is depressed to close the shutter and also the viewfinder aperture and stop the entry of all actinic light into chamber 30. Next, the reflecting member 52 is driven from the reflex position to the exposure position shown in solid lines in FIG. 1 by any suitable means, e.g., a spring. Upon the reflecting member reaching the exposure position, the shutter is operated to make the exposure, the image being directed toward the film unit 40 by mirror 58. After exposure of the film unit, the camera's motor is activated to move ram 62 to the right (as viewed in FIG. 2) thereby moving cranks 64, 68, link 80 and reflecting member 52 to the broken line position shown in FIG. 1. Note, the force of ram 62 moving to the right is transmitted to crank 78 not by shaft 68 but by spring 86 because, as previously mentioned, crank 78 is mounted on shaft 68 for limited rotation relative thereto. After the reflecting member has reached the second or reflex position, the exposed film unit is moved into the bit of rolls 36 wherein the processing liquid contained within the pod 46 is spread between elements 41 and 43 to initiate a diffusion transfer process as mentioned hereinbefore. The film unit is then advanced by the rolls to the exterior of the camera.

As will be apparent to those skilled in the art, should there be any appreciable interference with the movement of reflecting member 52 between the first and second positions, an excess load will be placed on the camera's motor and/or battery. Needless to say, if the camera's battery were capable of delivering enough energy to the motor during this overload period, the motor would be burned out and the camera rendered inoperative. Further, as is most likely, this overload condition may result in dissipating the battery's energy to a level whereat it is incapable of operating the camera's motor. If the battery is part of the film assemblage, i.e., it is located within film container 38, and there are still film units located within the film container, these unexposed film units will be lost because of the lack of sufficient energy to process them. One source of possible interference with movement of the reflecting member 52 is the user's fingers, i.e., the user, while he is operating the camera, may have inadvertently positioned his finger or thumb against the flexible bellows 32 and into the path of movement of the reflecting member as it moves toward the second position. In order to provide for this contingency, a lost-motion connection is provided between the drive means and the reflecting member 52. The lost-motion connection includes a generally X-shaped recess 92 located in crank 78 and a stop pin 94 which extends through shaft 68 and is located within recess 92 as shown in solid lines in FIG. 2. The recess 92, pin 94 and spring 86 cooperate to allow ram 62 to complete its stroke to the right without transmitting any force to the reflecting member 52. When the user's thumb or finger is located in the path of travel of the reflecting member 52 toward the second or broken line position shown in FIG. 1, the lost-motion connection functions as follows. Ram 62, under the influence of the camera's motor, is driven toward the right as viewed in FIG. 2 thereby rotating cranks 64, 78, shaft 68 and link 80 in a clockwise direction. If, during movement of ram 62 to the right, the mirror is stopped in its downward movement, link 80 and crank 78 will also stop rotating. However, ram 62 continues to rotate shaft 68 in a clockwise manner. Since crank 78 cannot move because of the interference with the movement of the reflecting member and since shaft 68 is still rotating, the energy of the rotating shaft is substantially stored in spring 86 because of its connection between the two. Meanwhile, recess 92 allows stop pin 94 to continue to rotate relative to crank 78. Note, the angle through which pin 94 can rotate is approximately equal to that through which crank 64 travels. Assuming that pin 94 has reached the broken line position shown in FIG. 2 when the source of interference has been removed, spring 86 will now release the energy previously stored to drive crank 78 in a clockwise direction until wall 96 of recess 92 engages stop pin 94. When wall 96 is again in contact with pin 94, the reflecting member 52 is again correctly aligned with the remainder of the drive system.

Spring 86 serves still another function, i.e., it allows ram 62 to move crank 64 through an arc greater than that necessary to move the reflecting member 52 into the second position without overloading the drive system thereby ensuring a lighttight seal between the reflecting member 52 and the film container 38. Needless to say, this provides for less stringent manufacturing tolerances since any excess travel of ram 62 will be compensated for by spring 86.

From the foregoing it can be seen that there has been disclosed a novel, inexpensive, and highly reliable overload control between the camera's drive system and a movably mounted reflecting member. The overload control senses interference to movement of the reflecting member and redirects the energy of the drive system to a spring wherein it is stored thereby protecting the camera's motor and/or battery from an overload condition. Upon removal of the interference, the stored energy is utilized to drive the reflecting member toward a reflex position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising: reflecting means mounted within said apparatus for movement between first and second positions; drive means for moving said reflecting means between said first and second positions; and force transmitting means coupled between said drive means and said reflecting means, said force transmitting means including means operable as a result of interference of said movement of said reflecting means between said first and second positions for disenabling said drive means from moving said reflecting means toward said second position until said interference has been removed.

2. Photographic apparatus as defined in claim 1 wherein said means actuable in response to interference drives said reflecting means toward said second position upon the removal of the interference.

3. Photographic apparatus as defined in claim 2 wherein said means actuable in response to interference include lost-motion means.

4. Photographic apparatus as defined in claim 3 wherein said lost-motion means includes means for storing a portion of the energy of said drive means during the period that the interference is present, said stored energy providing a force for moving said reflecting means toward said second position upon removal of the interference.

5. Photographic apparatus as defined in claim 2 wherein said drive means include a shaft and said force transmitting means include coupling means for coupling said reflecting means to said shaft for rotational movement of said shaft relative to said reflex means.

6. Photographic apparatus as defined in claim 5 wherein said means actuable in responsive to interference include resilient means having one end attached to said shaft and another end attached to said coupling means.

7. Photographic apparatus as defined in claim 6 further including stop means located on said shaft and adapted to cooperate with said coupling means for limiting the degree of relative rotation between said reflecting means and said shaft.

8. Photographic apparatus as defined in claim 7 wherein said stop means arrests rotation of said reflecting means relative to said shaft prior to said reflecting means passing beyond said second position.

9. Photographic apparatus as defined in claim 8 wherein said resilient means is the driving connection between said shaft and said coupling means.

10. Photographic apparatus as defined in claim 9 wherein said coupling means include spring means.

11. Photographic apparatus as defined in claim 1 wherein said force transmitting means includes means for enabling said drive means to be moved beyond a position necessary to move said reflecting means into said second position.

12. Photographic apparatus as defined in claim 11 wherein said enabling means include spring means for preventing the excess movement of said drive means from being transmitted to said reflecting means.

* * * * *

UNITED STATES PATENT OFFICE
CERTIFICATE OF CORRECTION

Patent No. 3,673,935　　　　　Dated July 4, 1972

Inventor(s) Edward H. Coughlan

It is certified that error appears in the above-identified patent and that said Letters Patent are hereby corrected as shown below:

Column 3, line 68 (Specification page 8, line 5)
　　change "bit" to --bite--.

Column 6, line 2 (Claim 5, line 5)
　　(Specification page 11, Claim 5, line 5)
　　change "reflex" to --reflecting--.

Column 6, line 4 (Claim 6, line 2)
　　(Specification page 12, Claim 6, line 2)
　　change "responsive" to --response--.

Signed and sealed this 13th day of November 1973.

(SEAL)
Attest:

EDWARD M. FLETCHER, JR.　　　　　RENE D. TEGTMEYER
Attesting Officer　　　　　　　　Acting Commissioner of Patents